US012579640B2

(12) United States Patent (10) Patent No.: US 12,579,640 B2
Tu et al. (45) Date of Patent: Mar. 17, 2026

(54) TRAINING METHOD AND APPARATUS FOR ANGIOGRAPHY IMAGE PROCESSING, AND AUTOMATIC PROCESSING METHOD AND APPARATUS

(71) Applicant: SHANGHAI PULSE MEDICAL TECHNOLOGY, INC., Shanghai (CN)

(72) Inventors: Shengxian Tu, Shanghai (CN); Chunming Li, Shanghai (CN); Hui Qin, Shanghai (CN); Shuzhan Chen, Shanghai (CN)

(73) Assignee: SHANGHAI PULSE MEDICAL TECHNOLOGY, INC., Shanghai (CN)

( * ) Notice: Subject to any disclaimer, the term of this patent is extended or adjusted under 35 U.S.C. 154(b) by 527 days.

(21) Appl. No.: 18/010,986

(22) PCT Filed: Apr. 21, 2021

(86) PCT No.: PCT/CN2021/088752
§ 371 (c)(1),
(2) Date: Dec. 16, 2022

(87) PCT Pub. No.: WO2021/258835
PCT Pub. Date: Dec. 30, 2021

(65) Prior Publication Data
US 2023/0230231 A1 Jul. 20, 2023

(30) Foreign Application Priority Data
Jun. 24, 2020 (CN) .......................... 202010587724.6

(51) Int. Cl.
*G06T 7/11* (2017.01)
*G06T 7/00* (2017.01)
(Continued)

(52) U.S. Cl.
CPC .............. *G06T 7/0012* (2013.01); *G06T 7/11* (2017.01); *G06V 10/774* (2022.01); *G06V 10/82* (2022.01);
(Continued)

(58) Field of Classification Search
CPC ..................... G06T 7/0012; G06T 7/11; G06T 2207/20081; G06T 2207/20084;
(Continued)

(56) References Cited

U.S. PATENT DOCUMENTS

| | | | |
|---|---|---|---|
| 2017/0258433 A1* | 9/2017 | Gulsun | ................ A61B 6/5217 |
| 2017/0265831 A1 | 9/2017 | Sankaran et al. | |
| 2018/0353241 A1* | 12/2018 | Tu | ......................... A61B 8/5223 |
| 2019/0110843 A1* | 4/2019 | Ummalaneni | ... A61B 1/000094 |
| 2020/0085382 A1 | 3/2020 | Taerum et al. | |

FOREIGN PATENT DOCUMENTS

| | | |
|---|---|---|
| CN | 104867147 A | 8/2015 |
| CN | 108022650 A | 5/2018 |

(Continued)

OTHER PUBLICATIONS

Wan, Tao, et al. "Automated coronary artery tree segmentation in X-ray angiography using improved Hessian based enhancement and statistical region merging." Computer methods and programs in biomedicine 157 (2018): 179-190.https://www.sciencedirect.com/science/article/pii/S0169260717300081 (Year: 2018).*

(Continued)

*Primary Examiner* — Han Hoang
(74) *Attorney, Agent, or Firm* — Maschoff Brennan

(57) ABSTRACT
A training method and apparatus for angiography image processing and a method and apparatus for automatically processing a vessel image. The training method includes obtaining training data that includes original angiography image data and local segmentation result data of a side branch vessel. The local segmentation result data of the side branch vessel are local segmentation image data of the side (Continued)

branch vessel on a main branch vessel determined from an original angiography image. A neural network is trained according to the obtained training data to make the neural network perform local segmentation on the side branch vessel on the determined main branch vessel in the original angiography image. The training method can obtain the neural network for performing local segmentation on the side branch vessel, thereby realizing improvement of segmentation accuracy while improving segmentation efficiency, and avoiding missing segmentation and wrong segmentation of the side branch vessel.

16 Claims, 12 Drawing Sheets

(51) Int. Cl.
*G06V 10/774* (2022.01)
*G06V 10/82* (2022.01)

(52) U.S. Cl.
CPC .............. *G06T 2207/20081* (2013.01); *G06T 2207/20084* (2013.01); *G06T 2207/30048* (2013.01); *G06T 2207/30101* (2013.01); *G06V 2201/03* (2022.01)

(58) Field of Classification Search
CPC . G06T 2207/30048; G06T 2207/30101; G06T 2207/10101; G06T 2207/10116; G06T 2207/10132; G06T 7/00; G06V 10/774; G06V 10/82; G06V 2201/03; G06N 3/0464; G06N 3/045; G06N 3/08
See application file for complete search history.

(56) References Cited

FOREIGN PATENT DOCUMENTS

| CN | 108765363 A | 11/2018 |
|---|---|---|
| CN | 109087306 A | 12/2018 |
| CN | 109360209 A | 2/2019 |
| CN | 109859146 A | 6/2019 |
| CN | 111210431 A | 5/2020 |
| JP | 2013-536706 A | 9/2013 |
| JP | 2018-139693 A | 9/2018 |
| JP | 2020-58591 A | 4/2020 |
| WO | 2012/028190 A1 | 3/2012 |

OTHER PUBLICATIONS

Chen Jianhui et al. "Automated Detection and Quantification of Coronary Artery Stenoses Based on Vessel Tree Segmentation in X-Ray Angiography" Jun. 2019, Chinese Journal of Biomedical Engineering, vol. 38 Issue (3): 266-272 DOI: 10.3969/j.issn.0258-8021.2019.03.002.

Zhao et al., "Semantic Segmentation to Extract Coronary Arteries in Fluoroscopy Angiograms" Published May 27, 2020, medRxiv.

Yang et al., "Automatic Coronary Artery Tree Labeling in Coronary Computed Tomographic Angiography Datasets", ISSN 0276-6574, Computing in Cardiology 2011;38:109-112, Retrieved on Apr. 16, 2024.

Rizvi et al., "Fractional Flow Reserve Measurement by Coronary Computed Tomography Angiography: A Review with Future Directions" Cardiovascular Innovations and Applications, vol. 2 No. 1 (2017) 125-135, ISSN 2009-8618, DOI 10.15212/CVIA.2016.0048, Dec. 28, 2016.

Carlier et al., "A new method for real-time co-registration of 3D coronary angiography and intravascular ultrasound or optical coherence tomography" Cardiovascular Revascularization Medicine 15 (2014) 226-232, Mar. 13, 2014.

* cited by examiner obtain training data S101 train a neural network according to the obtained training data to make the neural network perform local segmentation on side branch vessels on a determined main branch vessel in an original angiography image S102

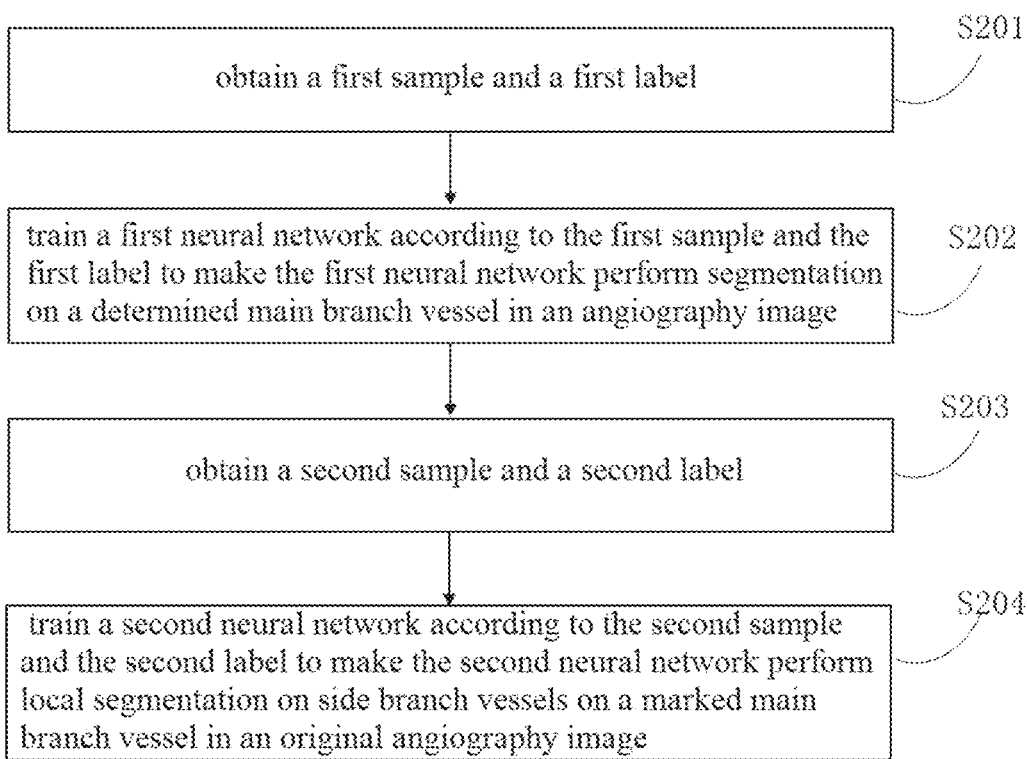

obtain a first sample and a first label                                                S201 train a first neural network according to the first sample and the first label to make the first neural network perform segmentation on a determined main branch vessel in an angiography image                                                S202 obtain a second sample and a second label                                                S203 train a second neural network according to the second sample and the second label to make the second neural network perform local segmentation on side branch vessels on a marked main branch vessel in an original angiography image                                                S204

Fig. 3

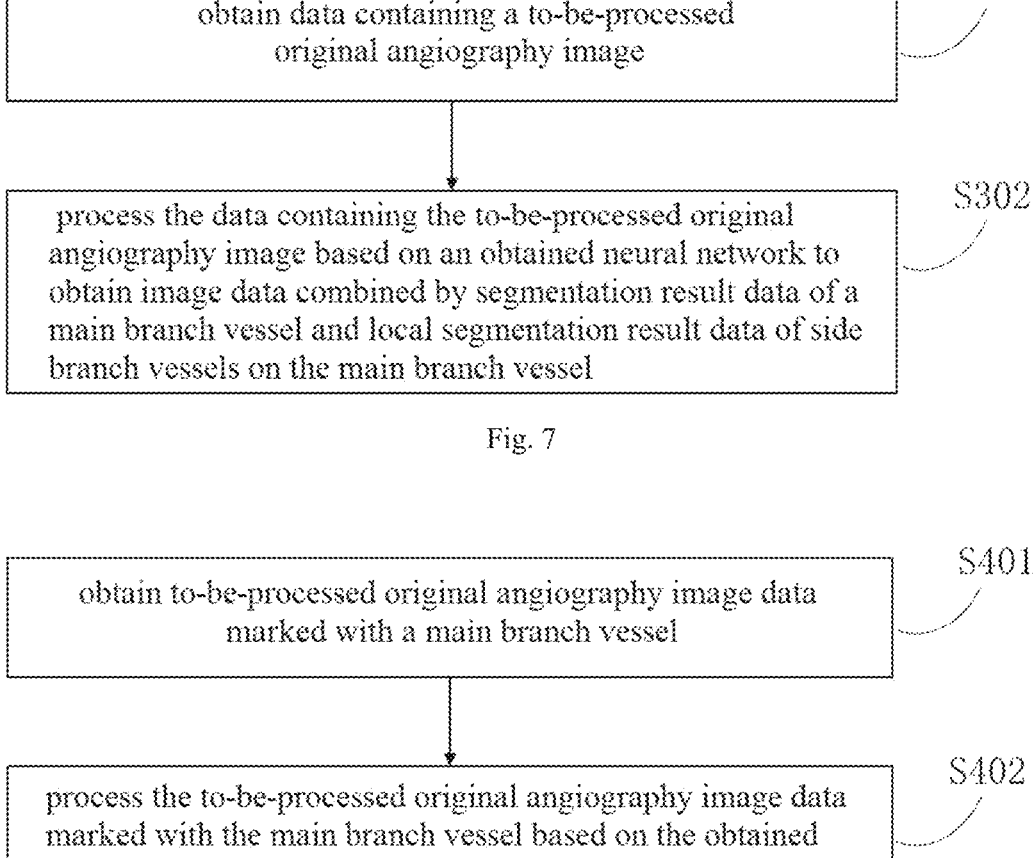

obtain data containing a to-be-processed
original angiography image — S301 process the data containing the to-be-processed original
angiography image based on an obtained neural network to
obtain image data combined by segmentation result data of a
main branch vessel and local segmentation result data of side
branch vessels on the main branch vessel — S302

Fig. 7 obtain to-be-processed original angiography image data
marked with a main branch vessel — S401 process the to-be-processed original angiography image data
marked with the main branch vessel based on the obtained
neural network, to obtain local segmentation image data of
side branch vessels on the marked main branch vessel — S402

Fig. 8

TRAINING METHOD AND APPARATUS FOR ANGIOGRAPHY IMAGE PROCESSING, AND AUTOMATIC PROCESSING METHOD AND APPARATUS

TECHNICAL FIELD

The present invention relates to the field of medical image processing, in particular to a training method and apparatus for angiography image processing, a method and apparatus for automatically processing a vessel image, a device and a storage medium.

BACKGROUND

Angiography is to inject a developer into a vessel so as to display an image under X-rays. Common examples are angiography images of cardiac, cerebral, retinal and pulmonary vessels and the like.

Taking angiocardiography images as an example, one of the research directions is the matching of endoluminal images and the angiocardiography images. For the treatment of coronary heart disease, endoluminal images such as optical coherence tomography (OCT) and intravascular ultrasound (IVUS) can evaluate the stability of coronary plaques with a high resolution, and their matching with coronary angiography can further confirm the exact location of a lesion in an angiography image to guide accurate treatment strategies and techniques. For the positioning of the endoluminal images in the angiography images, a current fusion technology of endovascular images and coronary angiography needs to change a traditional interventional operation process, and the angiography images are also collected at the same time of collecting the endovascular images, which requires a higher operation level of clinicians and technicians, making it difficult to match the endovascular images with the coronary angiography, thereby limiting the universal application of the fusion technology of the endovascular images and the angiography.

At present, a side branch vessel recognition technology based on the endoluminal images has been realized. The accurate detection of side branch vessels of coronary angiography can help to realize the matching of the side branch vessels in the images of the above two different modes, and realize the fusion of the endovascular images and coronary angiography without changing a current operation process.

Therefore, to realize the above improved effect of lowering the matching difficulty, side branch vessels in the angiography images need to be detected and segmented.

Another research direction is the calculation of a fractional flow reserve (FFR). For the diagnosis of coronary heart disease, the fractional flow reserve, as the gold standard, is universally acknowledged as the most accurate functional evaluation index at present, and has been recommended as class Ia clinical evidence by the European Society of Cardiology (ESC) Guidelines and class IIa clinical evidence by the American College of Cardiology (ACC) Guidelines. However, a method of obtaining the FFR through pressure wire measurement still has the limitations of time-consuming, high cost and the like, and is prone to increasing the risk of vascular injury. An FFR calculation method based on angiography images can overcome the limitations of the traditional method using a pressure wire to measure the FFR, and has become a research hotspot.

One of the key steps of FFR calculation based on angiography images is to obtain an ideal lumen size without stenosis. Theoretically, in the absence of stenosis, the ideal lumen size of a vessel conforms to the bifurcation shunt theorem (see formula 1 below, where $r_i$ represents a radius or diameter of a vessel lumen at the $i^{th}$ bifurcation from a proximal start point to a distal end point of a vessel segment. $R_i$ represents a radius or diameter of a vessel lumen between the $(i-1)^{th}$ bifurcation and the $i^{th}$ bifurcation from the proximal start point to the distal end point of the vessel segment. $R_0$ represents a radius or diameter of a vessel lumen at the proximal start point of the vessel segment; $R_k$ represents a radius or diameter of a vessel lumen at the distal end point of the vessel segment; and Ri' represents a radius or diameter of an ideal vessel lumen between the $(i-1)^{th}$ bifurcation and the $i^{th}$ bifurcation from the proximal start point to the distal end point of the vessel segment). The ideal lumen size will decrease step by step every time it passes through a side branch vessel. At present, the FFR calculation method based on coronary angiography only segments a main branch vessel to be analyzed, and simply sets the ideal lumen size to a linear descent mode, without considering the influence of the side branch vessels, so it may bring errors. Accurately obtaining the size of the side branch vessels can solve setting errors of an ideal lumen in the FFR calculation method based on the coronary angiography and improve the accuracy of FFR calculation.

$$R_i'^3 = R_{i-1}^3 - \frac{r_i^3}{\sum_{i=1}^{k} \omega_i r_i^3}(R_0^3 - R_k^3) \qquad \text{(Formula 1)}$$

Therefore, to improve the accuracy of FFR calculation, the side branch vessels in angiography images also need to be segmented to obtain a lumen radius or diameter of the side branch vessels.

At present, the detection and segmentation of side branch vessels in coronary angiography images are mainly realized in the following ways: extracting a coronary artery tree containing all vessels (including a whole main branch vessel and all branch vessels to vascular endings), and then analyzing a structure of the coronary artery tree to determine the main branch vessel and the side branch vessels.

Document I (Chen Jianhui, Zhao Lei, Li Deyu and Wan Tao, Automated Detection and Quantification of Coronary Artery Stenoses Based on Vessel Tree Segmentation in X-Ray Angiography [J]. Chinese Journal of Biomedical Engineering, 2019, 38(3): 266-272) provides a vessel tree segmentation method based on statistical region fusion, and a vascular skeleton line is obtained through a level set algorithm, thereby realizing detection and segmentation of the side branch vessels finally.

Patent document CN104867147A provides a SYNTAX automatic scoring method based on coronary angiography image segmentation. In this method, detection and segmentation of side branch vessels are realized in a way as follows: performing image enhancement and preprocessing on coronary angiography images to obtain a coronary binary image; obtaining a vascular centerline according to morphological operation; and finally realizing segmentation of the side branch vessels by recognizing an intersection of the vascular centerline.

At present, a method for segmenting a main branch vessel and side branch vessels still has limitations, and the segmentation effect is to be improved.

SUMMARY

The present invention provides a training method for angiography image processing, to realize segmentation of side branch vessels and solve the limitations of vessel segmentation.

To solve the above technical problems, an implementation of the present invention discloses a training method for angiography image processing, including: obtaining training data, wherein the training data include a sample and a label, the sample contains original angiography image data, and the label contains local segmentation result data of a side branch vessel on a determined main branch vessel; wherein local segmentation of the side branch vessel has a segmentation range extending from a head end of the side branch vessel to a segmentation terminal in an extending direction, the segmentation terminal is located between the head end and a tail end of the side branch vessel, the head end of the side branch vessel is a crossing end of the side branch vessel with the main branch vessel to which the side branch vessel belongs, the tail end is a farthest end of the side branch vessel, the extending direction is a direction from the head end to the tail end, and the segmentation terminal at least crosses a cross-section, perpendicular to a center line of the side branch vessel, of a bifurcation crest point of the segmented side branch vessel in the extending direction; and training a neural network according to the obtained training data to make the neural network perform local segmentation on the side branch vessel on the determined main branch vessel in an original angiography image.

By adopting the above technical solution, the neural network for performing local segmentation on the side branch vessel can be obtained, thereby realizing improvement of segmentation accuracy while improving segmentation efficiency, and avoiding missing segmentation and wrong segmentation of the side branch vessel.

According to another specific implementation of the present invention, the implementation of the present invention discloses the training method for angiography image processing. In the local segmentation result data of the side branch vessel, the segmented side branch vessel at least contains a segment of normal lumen; or, in the local segmentation result data of the side branch vessel, a length of the segmented side branch vessel is 1-10 times a diameter of a lumen of the main branch vessel to which the side branch vessel belongs.

According to another specific implementation of the present invention, the implementation of the present invention discloses the training method for angiography image processing. The normal lumen is a lumen without stenosis, expansion, overlapping, cutoff or deformation; or a length of the normal lumen in the extending direction is 1-15 mm.

According to another specific implementation of the present invention, the implementation of the present invention discloses the training method for angiography image processing. The sample is the original angiography image data, the label is the local segmentation result data of the side branch vessel on the determined main branch vessel, or the label is image data composed of segmentation result data of the main branch vessel and the local segmentation result data of the side branch vessel on the main branch vessel, and the segmentation result data of the determined main branch vessel are segmentation image data of the main branch vessel determined from the original angiography image.

According to another specific implementation of the present invention, the implementation of the present invention discloses the training method for angiography image processing. The sample is original angiography image data marked with the main branch vessel, the label is local segmentation result data of the side branch vessel on the marked main branch vessel, or the label is image data composed of segmentation result data of the marked main branch vessel and the local segmentation result data of the side branch vessel on the main branch vessel, and the segmentation result data of the marked main branch vessel are segmentation image data of the main branch vessel determined from the original angiography image.

According to another specific implementation of the present invention, the implementation of the present invention discloses the training method for angiography image processing. The neural network includes a first neural network and a second neural network, the sample includes a first sample and a second sample, and the label includes a first label and a second label. The first sample is the original angiography image data; and the first label is the segmentation result data of the determined main branch vessel, or the first label is the image data combined by the segmentation result data of the determined main branch vessel and the original angiography image data. The first neural network is trained according to the first sample and the first label to make the first neural network perform segmentation on the determined main branch vessel in the original angiography image. The second sample is the original angiography image data marked with the main branch vessel; the second label is the local segmentation result data of the side branch vessel on the marked main branch vessel, or the second label is the image data combined by the segmentation result data of the marked main branch vessel and the local segmentation result data of the side branch vessel on the main branch vessel; and the segmentation result data of the marked main branch vessel are the segmentation image data of the main branch vessel determined from the original angiography image. The second neural network is trained according to the second sample and the second label to make the second neural network perform local segmentation on the side branch vessel subordinate to the marked main branch vessel in the original angiography image.

The present invention discloses a training apparatus for angiography image processing, including: an obtaining module, configured to obtain training data; wherein the training data include a sample and a label, the sample contains original angiography image data, and the label contains local segmentation result data of a side branch vessel on a determined main branch vessel; wherein local segmentation of the side branch vessel has a segmentation range extending from a head end of the side branch vessel to a segmentation terminal in an extending direction, the segmentation terminal is located between the head end and a tail end of the side branch vessel, the head end of the side branch vessel is a crossing end of the side branch vessel with the main branch vessel to which the side branch vessel belongs, the tail end is a farthest end of the side branch vessel, the extending direction is a direction from the head end to the tail end, and the segmentation terminal at least crosses a cross-section, perpendicular to a center line of the side branch vessel, of a bifurcation crest point of the segmented side branch vessel in the extending direction; and a training module, configured to train a neural network according to the obtained training data to make the neural network perform local segmentation on the side branch vessel subordinate to the determined main branch vessel in an original angiography image.

According to another specific implementation of the present invention, the implementation of the present invention discloses the training apparatus for angiography image processing. In the local segmentation result data of the side branch vessel, the segmented side branch vessel at least contains a segment of normal lumen; or, in the local segmentation result data of the side branch vessel, a length of the segmented side branch vessel is 1-10 times a diameter of a lumen of the main branch vessel to which the side branch vessel belongs.

According to another specific implementation of the present invention, the implementation of the present invention discloses the training apparatus for angiography image processing. The normal lumen is a lumen without stenosis, expansion, overlapping, cutoff or deformation; or a length of the normal lumen in the extending direction is 1-15 mm.

According to another specific implementation of the present invention, the implementation of the present invention discloses the training apparatus for angiography image processing. The sample is the original angiography image data, the label is the local segmentation result data of the side branch vessel on the determined main branch vessel, or the label is image data combined by segmentation result data of the determined main branch vessel and the local segmentation result data of the side branch vessel on the main branch vessel, and the segmentation result data of the determined main branch vessel are segmentation image data of the main branch vessel determined from the original angiography image.

According to another specific implementation of the present invention, the implementation of the present invention discloses the training apparatus for angiography image processing. The sample is original angiography image data marked with the main branch vessel, the label is local segmentation result data of the side branch vessel on the marked main branch vessel, or the label is image data combined by segmentation result data of the marked main branch vessel and the local segmentation result data of the side branch vessel on the main branch vessel, and the segmentation result data of the marked main branch vessel are segmentation image data of the main branch vessel determined from the original angiography image.

According to another specific implementation of the present invention, the implementation of the present invention discloses the training apparatus for angiography image processing. The neural network includes a first neural network and a second neural network, the sample includes a first sample and a second sample, and the label includes a first label and a second label. The training module includes a first training module and a second training module, and the obtaining module includes a first obtaining module and a second obtaining module, wherein the first obtaining module is configured to obtain the first sample and the first label. The first sample is the original angiography image data; and the first label is the segmentation result data of the determined main branch vessel, or the first label is the image data combined by the segmentation result data of the determined main branch vessel and the original angiography image data. The first training module is configured to train the first neural network according to the first sample and the first label to make the first neural network perform segmentation on the determined main branch vessel in the original angiography image. The second obtaining module is configured to obtain the second sample and the second label. The second sample is the original angiography image data marked with the main branch vessel; the second label is the local segmentation result data of the side branch vessel on the marked main branch vessel, or the second label is the image data combined by the segmentation result data of the marked main branch vessel and the local segmentation result data of the side branch vessel on the main branch vessel; and the segmentation result data of the marked main branch vessel are the segmentation image data of the main branch vessel determined from the original angiography image. The second training module is configured to train the second neural network according to the second sample and the second label to make the second neural network perform local segmentation on the side branch vessel subordinate to the marked main branch vessel in the original angiography image.

The present invention provides a method for automatically processing a vessel image, including: obtaining data containing a to-be-processed original angiography image; and processing the data containing the to-be-processed original angiography image based on the neural network obtained through the above training method for angiography image processing, to obtain data containing a local segmentation image of a side branch vessel on a determined main branch vessel.

The present invention further provides a method for automatically processing a vessel image, including: obtaining first target image data, wherein the first target image data are to-be-processed original angiography image data; processing the first target image data based on the first neural network obtained through the above training method for angiography image processing, to obtain first result image data, wherein the first result image data contain segmentation image data of a determined main branch vessel; converting the first result image data to second target image data, wherein the second target image data are original angiography image data marked with the main branch vessel; and processing the second target image data based on the second neural network obtained through the above training method for angiography image processing, to obtain second result image data, wherein the second result image data contain local segmentation image data of a side branch vessel on the determined main branch vessel.

According to another specific implementation of the present invention, the implementation of the present invention discloses the method for automatically processing the vessel image. The first result image data are the segmentation image data of the determined main branch vessel, and the converting the first result image data to the second target image data includes: fusing the first result image data and the first target image data to obtain the original angiography image data marked with the main branch vessel.

According to another specific implementation of the present invention, the implementation of the present invention discloses the method for automatically processing the vessel image. The second result image data are the local segmentation image data of the side branch vessel on the determined main branch vessel, and the method for automatically processing the vessel image further includes: fusing the second result image data and the segmentation image data of the determined main branch vessel to obtain fused image data.

According to another specific implementation of the present invention, the implementation of the present invention discloses the method for automatically processing the vessel image. The method for automatically processing the vessel image further includes: receiving a converting instruction, and converting the first result image data to the second target image data according to the received converting instruction.

According to another specific implementation of the present invention, the implementation of the present invention discloses the method for automatically processing the vessel image. The method for automatically processing the vessel image further includes: inputting data of a segmentation image of a corrected main branch vessel, and updating data containing the segmentation image of the corrected main branch vessel as the first result image data.

The present invention provides an apparatus for automatically processing a vessel image, including: an angiography image obtaining module, configured to obtain data containing a to-be-processed original angiography image; and a processing module, configured to process the data containing the to-be-processed original angiography image based on the neural network obtained through the above training method for angiography image processing, to obtain data containing a local segmentation image of a side branch vessel on a determined main branch vessel.

The present invention further provides an apparatus for automatically processing a vessel image, including: a first target image data obtaining module, configured to obtain first target image data, wherein the first target image data are to-be-processed original angiography image data; a first processing module, configured to process the first target image data based on the first neural network obtained through the above training method for angiography image processing, to obtain first result image data, wherein the first result image data contain segmentation image data of a determined main branch vessel; a converting module, configured to convert the first result image data to second target image data, wherein the second target image data are original angiography image data marked with the main branch vessel; a second target image obtaining module, configured to obtain the second target image data; and a second processing module, configured to process the second target image data based on the second neural network obtained through the above training method for angiography image processing, to obtain second result image data, wherein the second result image data contain local segmentation image data of a side branch vessel on the determined main branch vessel.

According to another specific implementation of the present invention, the implementation of the present invention discloses the apparatus for automatically processing the vessel image. The first result image data are the segmentation image data of the determined main branch vessel, and the converting module is configured to fuse the first result image data and the first target image data to obtain the original angiography image data marked with the main branch vessel.

According to another specific implementation of the present invention, the implementation of the present invention discloses the apparatus for automatically processing the vessel image. The second result image data are the local segmentation image data of the side branch vessel on the determined main branch vessel, and the apparatus for automatically processing the vessel image further includes a post-processing module configured to fuse the second result image data and the segmentation image data of the determined main branch vessel to obtain fused image data.

According to another specific implementation of the present invention, the implementation of the present invention discloses the apparatus for automatically processing the vessel image. The apparatus for automatically processing the vessel image further includes a receiving module configured to receive a converting instruction, wherein the converting module is configured to convert the first result image data to the second target image data according to the received converting instruction.

According to another specific implementation of the present invention, the implementation of the present invention discloses the apparatus for automatically processing the vessel image. The apparatus for automatically processing the vessel image further includes an input module configured to input data of a segmentation image of a corrected main branch vessel, and update data containing the segmentation image of the corrected main branch vessel as the first result image data.

The present invention provides a computer device, including a processor and a memory, wherein the memory stores at least one instruction, and the at least one instruction, when executed by the processor, implements the above training method for angiography image processing, or the above method for automatically processing the vessel image.

The present invention provides a computer readable storage medium, storing at least one instruction, wherein the at least one instruction, when executed, implements the above training method for angiography image processing, or the above method for automatically processing the vessel image.

The present invention further provides a method for registering an endoluminal image and an angiography image, including: obtaining a local segmentation image of a side branch vessel by adopting the above method for automatically processing the vessel image; obtaining a segmentation image of a main branch vessel to which the side branch vessel belongs; and matching the segmentation image of the main branch vessel and the segmentation image of the subordinate side branch vessel with the endoluminal image of the main branch vessel.

The present invention further provides a method for calculating a fractional flow reserve, including: obtaining a local segmentation image of a side branch vessel by adopting the above method for automatically processing the vessel image; obtaining a segmentation image of a main branch vessel to which the side branch vessel belongs; and obtaining diameters or radiuses of the main branch vessel and the side branch vessel according to the segmentation image of the main branch vessel and the subordinate side branch vessel, working out geometric parameters of an ideal lumen of the main branch vessel, and obtaining the fractional flow reserve of the main branch vessel by calculation.

BRIEF DESCRIPTION OF THE DRAWINGS

FIG. 3 shows a schematic flow diagram of a training method for angiography image processing according to another embodiment of the present invention;

FIG. 7 shows a schematic flow diagram of a method for automatically processing a vessel image according to an embodiment of the present invention;

FIG. 8 shows a schematic flow diagram of a method for automatically processing a vessel image according to another embodiment of the present invention;

DETAILED DESCRIPTION

Figure 1:
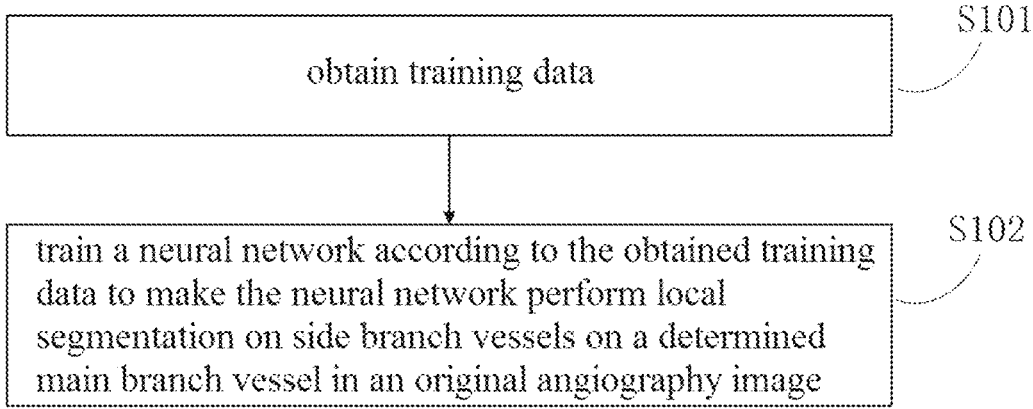
FIG. 1 shows a schematic flow diagram of a training method for angiography image processing according to an embodiment of the present invention.

The implementation of the present invention is described below by specific detailed embodiments, and those skilled in the art can easily understand other advantages and effects of the present invention from the contents disclosed in the specification. Although the description of the present invention will be introduced in combination with preferred embodiments, it does not mean that the features of the present invention are limited to the implementation only. On the contrary, the purpose of introducing the invention in combination with the implementation is to cover other options or modifications that may be extended based on the claims of the present invention. In order to provide deep understanding of the present invention, many specific details will be included in the following description. The present invention can also be implemented without using these details. In addition, in order to avoid confusing or blurring the focus of the present invention, some specific details will be omitted in the description. It should be noted that the embodiments in the present invention and features in the embodiments can be combined with each other in the case of not conflicting.

It should be noted that in this specification, similar numerals and letters represent similar items in the following drawings. Therefore, once an item is defined in a drawing, it does not need to be further defined and explained in subsequent drawings.

The terms "first" and "second" are only used to distinguish descriptions, and cannot be understood as indicating or implying relative importance.

In order to make the objects, technical solutions and advantages of the present invention more clear, the implementation of the present invention will be further described in detail below in combination with the accompanying drawings.

As described above, the inventor found that automatic segmentation methods for angiography images in the prior art are divided into two kinds in principle. One is to segment vessels by detecting features of the vessels, and the other is to find bifurcation points on an angiogram first and then segment the vessels through the bifurcation points. Based on the above segmentation principles, the existing automatic segmentation methods for the angiography images can recognize a whole side branch vessel. Therefore, in addition to segment a main branch vessel, the whole side branch vessel will be segmented completely. However, the existing segmentation methods have many limitations.

Description is made by taking the coronary artery as an example. First, because vessels in the three-dimensional space are projected onto a two-dimensional plane, the phenomenon of vessel overlapping may inevitably occur no matter what body position is used in the acquisition of angiography images, and the overlapping phenomenon may be more serious especially when side branch vessels are long. This overlapping phenomenon not only makes it very difficult to extract main and side branch vessels from a coronary artery tree, but also seriously affects the accuracy of side branch vessel detection.

Second, because of the imaging characteristics of angiography, the tinier the vessel is, the closer it is to the end of the vessel, and the later it develops. At the same time, as time goes on, the exudation effect of an angiography agent becomes more and more obvious, resulting in a poor segmentation effect of an algorithm at the thin vessel, so conditions such as vessel fracture, even missing segmentation and wrong segmentation may occur.

In addition, completely segmenting the main branch vessel and the side branch vessels also consumes much time.

To this end, the present invention provides a training method for angiography image processing to train a neural network so as to obtain a trained neural network model, thereby realizing local segmentation of side branch vessels subordinate to a main branch vessel.

Figure 2:
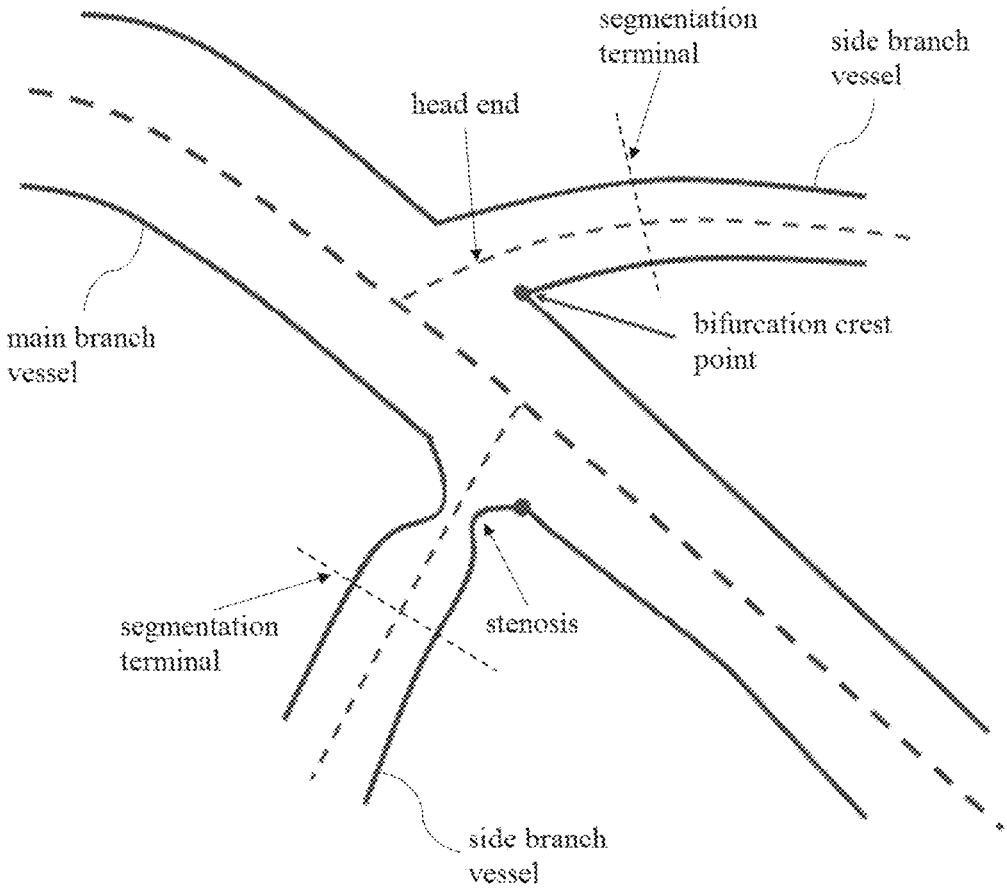
FIG. 2 shows a schematic diagram of local segmentation of side branch vessels on a main branch vessel according to an embodiment of the present invention.
Figure 12:
FIG. 12 shows a schematic diagram of original angiography image data according to an embodiment of the present invention.

Referring to FIG. 1 and FIG. 2, to this end, the training method for angiography image processing of the present invention includes the following steps: S101, training data are obtained; and S102, the neural network is trained according to the obtained training data to make the neural network perform local segmentation on the side branch vessels on the determined main branch vessel in an angiography image. The above training data at least include original angiography image data and local segmentation result data of the side branch vessels. The training data include a sample and a label, the sample contains the original angiography image data, and the label contains the local segmentation result data of the side branch vessels on the determined main branch vessel. The original angiography image data are angiography image data obtained for a specific position, and the image data may be in a picture format or a format converted from a picture. For example, an original angiography image used as the training data shown in FIG. 12 is converted to the image data to serve as sample data. In the present embodiment, the image may be converted to a Mask image (binary image) to serve as the training data. The original angiography image is an image obtained at a specifically selected position, so generally, only one main branch vessel is presented in the image, or, even if two main branch vessels appear, one of the main branch vessels is located at a front-view position, while the other main branch vessel is located at a corner and is not completely presented. In the training method of the present invention, the neural network is trained to perform local segmentation on the side branch vessels subordinate to the main branch vessel located at the front-view position in the original angiography image.

In the training data, the local segmentation result data of the side branch vessels are local segmentation image data of the side branch vessels on the main branch vessel determined from the original angiography image, which may also be converted to a Mask image to serve as the training data. In the local segmentation image data of the side branch vessels, local segmentation has a segmentation range from head ends of the side branch vessels to segmentation terminals in an extending direction, the segmentation terminals are located between the head ends and tail ends of the side branch vessels, the head ends of the side branch vessels are crossing ends of the side branch vessels with the main branch vessel to which the side branch vessels belong, the tail ends are farthest ends of the side branch vessels, and the extending direction is a direction from the head ends to the tail ends. The segmentation terminals at least cross cross-sections, perpendicular to center lines of the side branch vessels, of bifurcation crest points of the segmented side branch vessels in the extending direction.

In the above training method, the main branch vessel may be viewed as needed, namely the main branch vessel of interest. To take an anterior descending artery as an example, a corresponding original angiography image of the anterior descending artery is obtained, the main branch vessel of interest is found in the image as the determined main branch vessel, the main branch vessel is segmented first to obtain a segmented image of the main branch vessel, and the main branch vessel in the image is marked for example by using marking software to mark a contour of the main branch vessel. With the main branch vessel, all side branch vessels belonging to the main branch vessel are then found according to marks, and the side branch vessels on the main branch vessel are locally segmented.

The training method of the present invention realizes automatic local segmentation of the side branch vessels by the neural network. Local segmentation only segments part of each side branch vessel, instead of completely segmenting each side branch vessel. The above segmentation terminals are positions of terminals of the segmented parts, and the segmented parts are from the head ends of the side branch vessels to the positions where the segmentation terminals are located in the extending direction. The extending direction may be understood as the direction extending from the head ends to the tail ends of the side branch vessels, for example, it may be a direction extending from head ends to tail ends of the center lines of the side branch vessels in FIG. 2. Due to local segmentation, the segmentation terminals are located between the head ends and the tail ends of the side branch vessels, and a specific position in the middle of each of the side branch vessels is not limited. What needs to be met is that the segmentation terminals at least cross the cross-sections, perpendicular to the center lines of the side branch vessels, of the bifurcation crest points of the segmented side branch vessels in the extending direction. That is, the segmentation range of the side branch vessels in the extending direction covers the cross-sections, perpendicular to the center lines of the side branch vessels, of the bifurcation crest points, so that it is guaranteed that intersection parts between the segmented side branch vessels and the main branch vessel to which the side branch vessels belong can be completely retained.

The training method for angiography image processing of the present invention can not only train processed angiography images of cardiac vessels, but also train processed angiography images of cerebral vessels, retinal vessels, pulmonary vessels, renal arteries, etc.

The present invention breaks the conventional idea of full segmentation of the side branch vessels and trains the method for local segmentation of the side branch vessels. Compared with full segmentation, local segmentation avoids the problems of segmentation deviation caused by overlapping and exudation effects, segmentation results are accurate, the segmentation difficulty is greatly lowered, and the segmentation time of the angiography images is shortened. In addition, although the segmented side branch vessels are only part of the complete side branch vessels due to local segmentation, application of local segmentation to most fields is not affected.

For example, the inventor found that registration between coronary angiography images and OCT or IVUS images does not need information of distal ends of the side branch vessels, so it is not necessary to completely segment the side branch vessels. It is difficult to expose the whole main branch vessel and the whole side branch vessels at the same time in an angiographic projection position, and there will be many problems if the main branch vessel and the side branch vessels are completely segmented. However, it is easier to expose the whole main branch vessel and small segments of the side branch vessels. Therefore, the present invention can implement a more effective and robust detection method for the side branch vessels by training the neural network, that is, the method of local segmentation (also understood as short segmentation) is used to obtain a segmented image capable of being used as an angiography image matched with the OCT or IVUS images. The OCT or IVUS images belong to endoluminal images. Since the range of the segmented side branch vessels has covered the cross-sections, perpendicular to the center lines of the side branch vessels, of the bifurcation crest points, the integrity of the intersections between the side branch vessels and the main branch vessel is retained. When the angiography image is matched with the OCT or IVUS images, positions, sizes and other information of intersections on the OCT or IVUS images can be compared with positions, sizes and other information of the intersections on the segmented angiography image of the vessels, the angiography image can be matched with intravascular images in position, and the matching between the intravascular images and coronary angiography is realized without changing a current operation process.

For another example, in FFR calculation based on coronary angiography, only a diameter of a lumen at a bifurcation needs to be paid attention to. That is, in the case of a long side branch vessel, the influence of a distal end of the side branch vessel on FFR calculation may be ignored. Therefore, only radiuses or diameters of lumens of the side branch vessels need to be calculated from the locally-segmented side branch vessels.

Further, as another specific implementation of the present invention, a segmented side branch vessel in a method for processing a vessel image at least contains a segment of normal lumen. Said normal lumen is a lumen without stenosis, expansion, overlapping, cutoff or deformation. A deformed lumen is for example a lumen with the shape obviously changed or with an unclear contour. The segment of normal lumen has a clear contour, with a diameter changing gently. Containing the normal lumen can guarantee accurate measurement of the radiuses or diameters of the lumens of the side branch vessels for further application.

An existing artificial method or software may be adopted to measure the radiuses or diameters of the lumens of the side branch vessels. In a software method, a segment of normal lumen is generally simulated as a cylinder to obtain the radius or diameter of the lumen.

In order to make results of the side branch vessels segmented by the neural network meet a preset condition, when the training data are made, lengths of the locally segmented side branch vessels may be uniformly specified. To make radius or diameter calculation convenient, in the made training data, lengths of normal lumens in the locally segmented side branch vessels in the extending direction may be set according to specific standards, and a specified length may be set in advance. For example, the specified length may be set as 1-10 times a diameter of a lumen of the main branch vessel, specifically 2-6 times, and more specifically 3 times or 5 times. Or, from another aspect, as for a specific size for example, the specified length may be 1-15 mm, further 1-10 mm, and more further 2-8 mm. By making the training data through the above standard, the neural network can obtain the better learning effect.

Further, with respect to making the training data, when the side branch vessels are locally segmented, the lengths of the segmented side branch vessels will be shortened as much as possible while it is guaranteed that the segments of the normal lumens are contained, thereby avoiding adverse impact on the side branch vessels at the distal ends as much as possible. At the time of local segmentation, the main branch vessel to be handled is found first. The original angiography image generally contains one kind of main branch vessel. For example, in an original angiography image obtained for the left circumflex artery, all side branch vessels of the left circumflex artery are locally segmented according to the left circumflex artery in the image. With the positions of the cross-sections, perpendicular to the center lines of the side branch vessels, of the bifurcation crest points of the segmented side branch vessels as beginning ends, the segmentation terminals are determined between the head ends and the tail ends of the side branch vessels in the extending direction. For example, when there is a segment of normal lumen in the extending direction from the positions of the cross-sections, perpendicular to the center lines of the side branch vessels, of the bifurcation crest points of the side branch vessels, the segmentation terminals may be determined under the specified length. If there is an abnormal lumen region with stenosis, expansion, overlapping, cutoff or deformation in the extending direction from the positions of the cross-sections, perpendicular to the center lines of the side branch vessels, of the bifurcation crest points of the side branch vessels, the segmentation terminals are determined after extending backwards by a segment from the abnormal lumen segment. That is, the segmentation range covers the abnormal lumen segment and further contains a segment of normal lumen.

In the above embodiments, the training data are the sample and the label. The above training method includes: the sample and the label are obtained, where the sample at least contains the original angiography image data, and the label at least contains the local segmentation result data of the side branch vessels on the determined main branch vessel.

Specifically, as one of the embodiments of the present invention, the sample is the original angiography image data, that is, the original angiography image is converted to a binary image for the neural network to learn, and the label is the local segmentation result data of the side branch vessels on the marked main branch vessel, or the label is the image data combined by segmentation result data of the determined main branch vessel and the local segmentation result data of the side branch vessels on the main branch vessel. The segmentation result data of the determined main branch vessel are segmentation image data of the main branch vessel determined from the original angiography image. The segmentation result data of the main branch vessel and the local segmentation result data of the side branch vessels on the main branch vessel are combined, that is, an image of the main branch vessel and local segmentation images of the side branch vessels on the main branch vessel are combined into the same image data. For example, they may be combined through a method of fusing the segmented image of the main branch vessel and the local segmentation result data of the side branch vessels. The neural network is trained by adopting the training data in the present embodiment. When the label during training is the local segmentation result data of the side branch vessels on the determined main branch vessel, at a test stage, by inputting the original angiography image data to the neural network, the neural network outputs the local segmentation result data of the side branch vessels on the main branch vessel, that is, displayed image data output by the trained neural network are only the local segmentation result data of the side branch vessels. When the label during training is the image data combined by the segmentation result data of the main branch vessel and the local segmentation result data of the side branch vessels on the main branch vessel, at the test stage, by inputting the original angiography image data to the neural network, the neural network outputs the image data combined by the segmentation result data of the main branch vessel and the local segmentation result data of the side branch vessels on the main branch vessel, that is, the trained neural network outputs the local segmentation result data of the side branch vessels and the segmentation result data of the main branch vessel. The neural network is trained in one step by adopting the sample and the label of the present embodiment. When the neural network is tested and the original angiography image data are input, at least the image data of the side branch vessels after local segmentation can be output, and the locally segmented side branch vessels are all the side branch vessels on the uniquely determined main branch vessel in the original angiography image. The neural network model trained by the training method of the present embodiment realizes one-step automatic segmentation.

Figure 14:
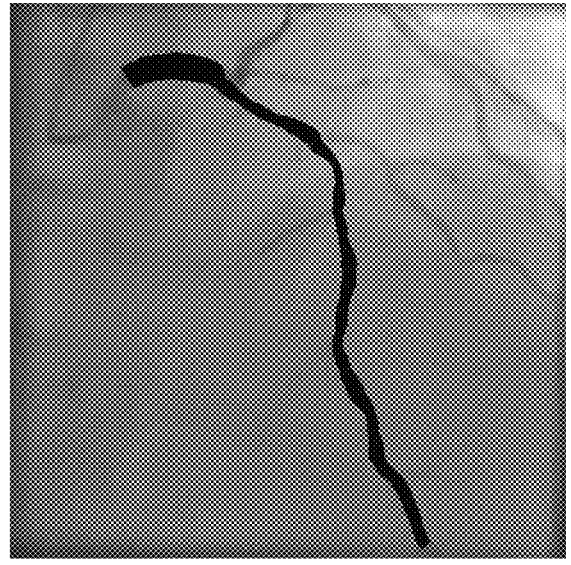
FIG. 14 shows a schematic diagram of image data obtained by fusing segmentation result data of a main branch vessel and original angiography image data according to an embodiment of the present invention.

As another embodiment of the present invention, the sample is original angiography image data marked with the main branch vessel, the label is local segmentation result data of the side branch vessels on the marked main branch vessel, or the label is image data combined by segmentation result data of the marked main branch vessel and the local segmentation result data of the side branch vessels on the main branch vessel, and the segmentation result data of the marked main branch vessel are segmentation image data of the main branch vessel determined from the original angiography image. The original angiography image data marked with the main branch vessel in the present embodiment contain both the segmentation result data of the main branch vessel and the original angiography image, and are a result combining the segmentation result data of the main branch vessel and the original angiography image. Referring to FIG. 14, for example, the segmented main branch vessel image in the angiography image may be fused with the original angiography image to form an image mask. FIG. 14 presents a schematic diagram of an image corresponding to data formed by fusing the segmentation result data of the main branch vessel and the original angiography image data. After fusion, a contour of the main branch vessel in the original angiography image will be marked. Or, the contour of the main branch vessel may also be directly marked in the original angiography image, so as to obtain the angiography image marked with the main branch vessel.

In the above embodiment, the sample for training the neural network has marked the main branch vessel, and the neural network only needs to be trained to detect all the side branch vessels on the segmented main branch vessel and perform local segmentation on these side branch vessels. The sample may be obtained by artificially segmenting the main branch vessel, or the main branch vessel may also be segmented by adopting a computer algorithm, and then the segmentation result data of the main branch vessel and the original angiography image data are fused to obtain the original angiography image marked with the main branch vessel, so that the original angiography image data, such as the binary image, marked with the main branch vessel are made. The main branch vessel may be automatically and separately segmented by adopting an existing algorithm.

As shown in FIG. 3, the present invention further provides a specific embodiment of a training method for angiography image processing. The training method adopts step-by-step training to train two neural networks. In the present embodiment, the neural networks include a first neural network and a second neural network, a sample includes a first sample and a second sample, and a label includes a first label and a second label. The training method specifically includes: S201, the first sample and the first label are obtained; S202, the first neural network is trained according to the first sample and the first label to make the first neural network perform segmentation on a determined main branch vessel in an original angiography image; S203, the second sample and the second label are obtained; and S204, the second neural network is trained according to the second sample and the second label to make the second neural network perform local segmentation on side branch vessels on a marked main branch vessel in an angiography image.

Figure 13:
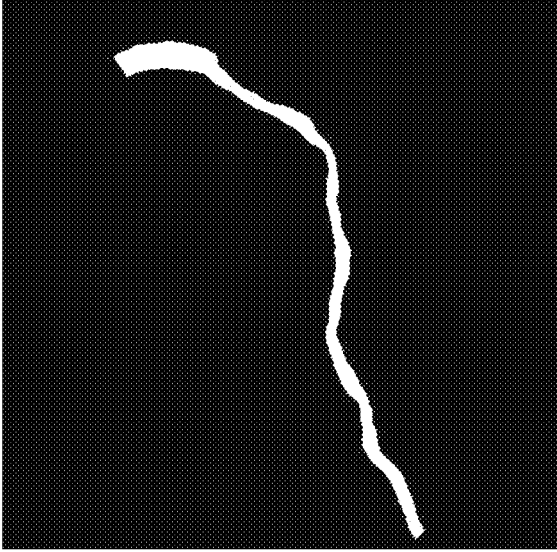
FIG. 13 shows a schematic diagram of segmentation result data of a main branch vessel according to an embodiment of the present invention.

The first sample is original angiography image data, for example, FIG. 12 shows the original angiography image, the original angiography image is converted to the original angiography image data to form first sample data. The first label is segmentation result data of the determined main branch vessel, for example, FIG. 13 shows image data displayed after segmentation of the main branch vessel, the image is converted to the segmentation result data of the main branch vessel to serve as first label data. Or the first label is image data combined by the segmentation result data of the determined main branch vessel and the original angiography image data, for example, FIG. 14 shows data containing both the segmentation result data of the main branch vessel and the original angiography image data, and the combined image data as shown in FIG. 14 serve as the first label data. When the first label is the segmentation result data of the main branch vessel, at a test stage, by inputting the original angiography image data to the first neural network, the first neural network outputs the segmentation result data of the main branch vessel in the original angiography image. When the first label is the image data combined by the segmentation result data of the main branch vessel and the original angiography image data, at the test stage, by inputting the original angiography image data to the first neural network, the first neural network outputs the image data combined by the segmentation result data of the main branch vessel and the original angiography image data, namely, presents an angiography image marked with the main branch vessel.

The second sample is the original angiography image data marked with the main branch vessel. For example, FIG. 14 presents that the second sample contains both the original angiography image and the segmentation result data of the main branch vessel, and is a result combined by the segmentation result data of the main branch vessel and the original angiography image. The second sample may be obtained, for example, in a mode of fusing the segmentation result data of the main branch vessel and the original angiography image, that is, the original angiography image in FIG. 12 and the segmentation result data of the main branch vessel in FIG. 13 are fused to obtain fused image data as shown in FIG. 14, and then the image data serve as second sample data. In FIG. 14, a contour of the main branch vessel is marked with black, and in other embodiments, the segmented main branch vessel may further be marked with a chromatic color. Or the second sample data may also be made in a mode of directly marking the main branch vessel in the original angiography image. The second sample may implement combination of the original angiography image and the segmentation result data of the main branch vessel in combination with a technology of artificial main branch vessel segmentation and algorithm fusion, or segmentation of the main branch vessel and combination of the main branch vessel and the original angiography image may also be implemented by completely adopting an algorithm. The second label is the local segmentation result data of the side branch vessels on the marked main branch vessel, or the second label is image data combined by the segmentation result data of the marked main branch vessel and the local segmentation result data of the side branch vessels on the main branch vessel. The combination mode may refer to the method mentioned in the above embodiment as well.

Figure 15:
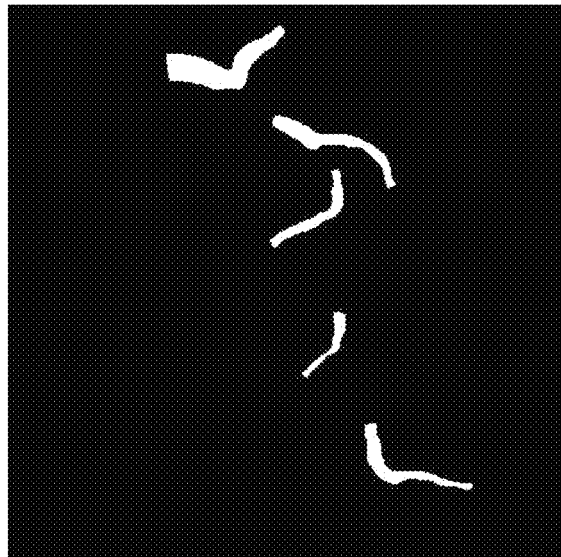
FIG. 15 shows a schematic diagram of local segmentation result data of side branch vessels on a main branch vessel according to an embodiment of the present invention.
Figure 16A:
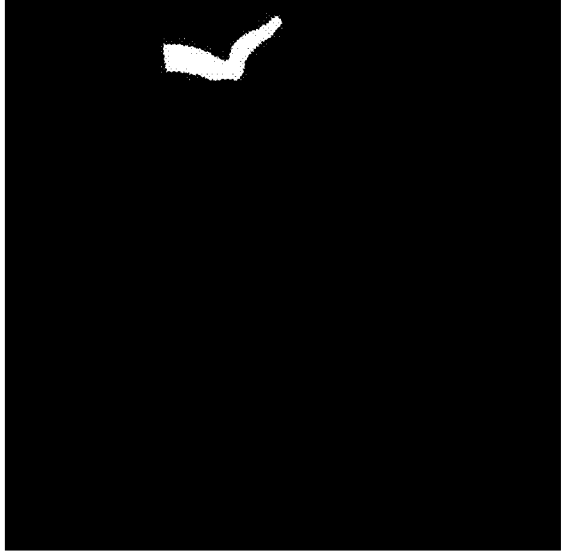
FIGS. 16A-16E show schematic diagrams of image data of each side branch vessel segmented after local segmentation according to an embodiment of the present invention.
Figure 16B:
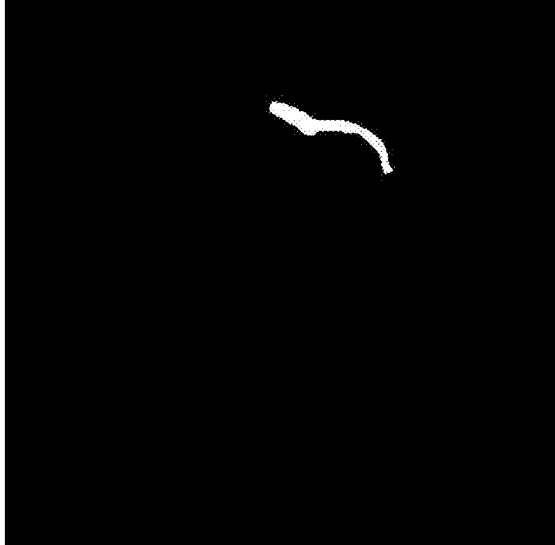
Figure 16C:
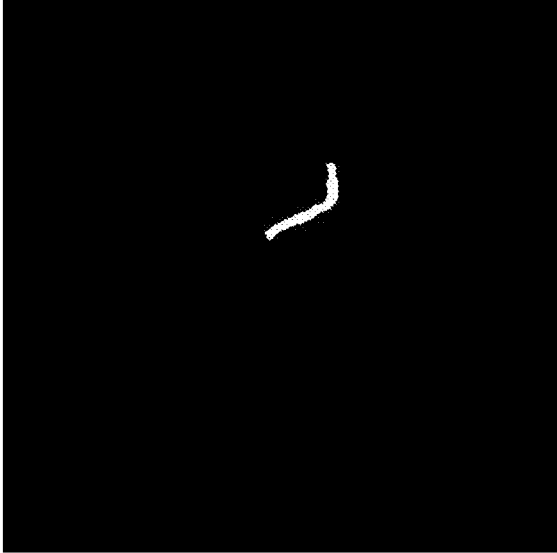
Figure 16D:
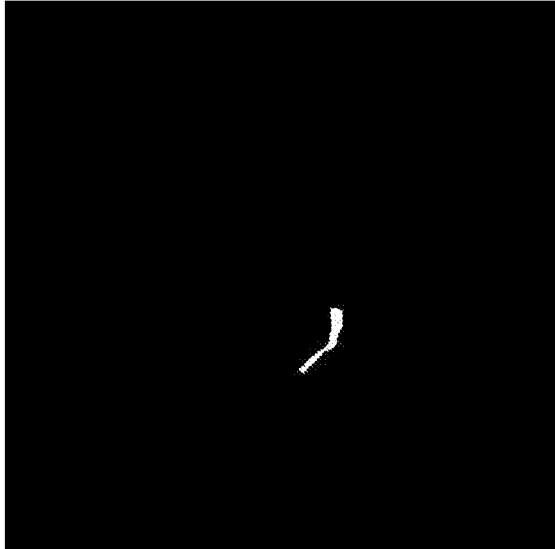
Figure 16E:
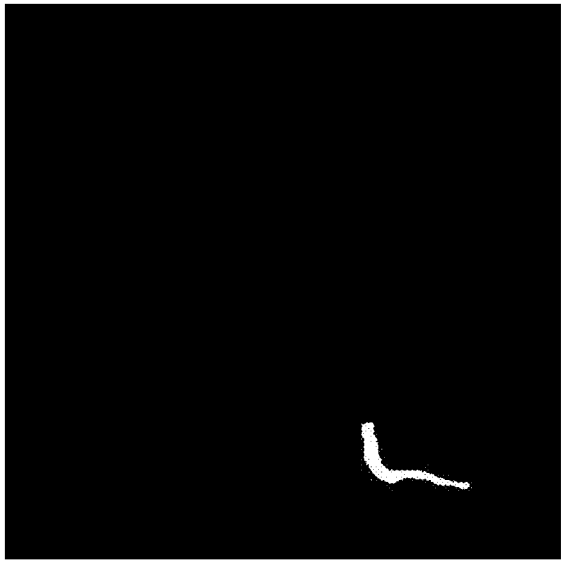

As for making of the second sample, for example, referring to FIG. 15, FIG. 15 is the side branch vessels locally segmented according to the original angiography image in FIG. 12, the image data in FIG. 15 are correspondingly made into second label data, the correspondingly obtained second label is the local segmentation result data of the side branch vessels, and the second label made through the method may be configured to implement semantic segmentation of the side branch vessels. Or, referring to FIG. 16A-FIG. 16E, a local segmentation Mask of each side branch vessel is obtained after local segmentation of the side branch vessels, and then all side branch vessel Masks are merged to form the local segmentation result data containing all the side branch vessels to serve as the second label. The second label made through the method may implement instance segmentation of the side branch vessels. In the present embodiment, the method for making the second label may also be applied to the making method of the label in all the above embodiments.

The above segmentation result data of the marked main branch vessel are segmentation image data of the main branch vessel determined from the original angiography image. When the second label is the segmentation result data of the side branch vessels on the marked main branch vessel, at the test stage, by inputting the original angiography image data marked with the main branch vessel to the second neural network, the second neural network outputs the local segmentation result data of the side branch vessels on the marked main branch vessel. When the second label is the image data combined by the segmentation result data of the main branch vessel and the local segmentation result data of the side branch vessels, at the test stage, by inputting the original angiography image data marked with the main branch vessel to the second neural network, the second neural network outputs the image data combined by the segmentation result data of the marked main branch vessel and the local segmentation result data of the side branch vessels on the main branch vessel, namely presents an image marked with a main branch vessel contour and part of contours of the side branch vessels on the main branch vessel. When the second neural network is trained, by fusing the segmentation result data of the main branch vessel and the original angiography image data, an obtained overlapping result has marked the determined main branch vessel, and the second neural network after training may perform local segmentation on the side branch vessels on the main branch vessel determined by marking with the marked main branch vessel serving as the determined main branch vessel.

As for the training method in the above embodiment, the first neural network and the second neural network may be trained separately or synchronously. The first neural network and the second neural network may be set in different computers or integrated in one processor, which is not limited by the present invention.

The two neural networks are selected in the above embodiment to be trained respectively. The first neural network is trained to be capable of performing segmentation on the main branch vessel, and the second neural network is trained to be capable of at least performing segmentation on all the side branch vessels on the main branch vessel. The accuracy of segmentation of the neural networks can be increased by adopting the step-by-step training mode. Furthermore, because an angiography image of the main branch vessel and an angiography image of the side branch vessels of one case are generally different in data volume, segmentation of the main branch vessel and local segmentation of the side branch vessels are trained respectively, and the training effect is better as well.

The sample and the label mentioned in all the above embodiments are data input to the neural networks for training, and may be made into a Mask, namely, a Mask image (binary image). Generally, only one main branch vessel is displayed on an original angiography image, or even if there are two main branch vessels, only one of the main branch vessels is at a front-view position. Therefore, when the training data are made, the uniquely determined main branch vessel on the original angiography image is segmented, or when there are two main branch vessels in the original angiography image, the main branch vessel uniquely at the front-view position is segmented, and a segmentation result is input to the neural networks for learning.

In all the above embodiments, the angiography image may be processed in an artificial segmentation mode, and a large number of results are segmented to be made into a training set for the neural networks to learn. An artificial segmentation method may be manual segmentation, or segmentation combining segmentation software with manual selection. The training data for the neural networks to learn may also be obtained by adopting other segmentation modes, which is not limited by the present invention.

The neural networks of the present invention may be a convolutional neural network, and a neural network structure further uses Mask R-CNN.

Figure 4:
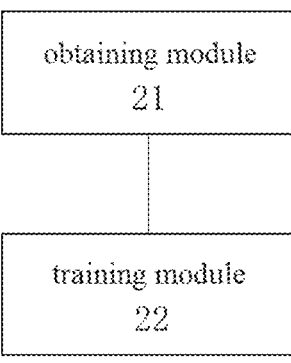
FIG. 4 shows a schematic diagram of a training apparatus for angiography image processing according to an embodiment of the present invention.

As shown in FIG. 4, the present invention provides a training apparatus for angiography image processing, including: an obtaining module 21, configured to obtain training data; and a training module 22, configured to train a neural network according to the obtained training data to make the neural network perform local segmentation on side branch vessels on a determined main branch vessel in an original angiography image. The training data include original angiography image data and local segmentation result data of the side branch vessels, and the local segmentation result data of the side branch vessels are local segmentation image data of the side branch vessels on the main branch vessel determined from the original angiography image. Local segmentation has a segmentation range extending from head ends of the side branch vessels to segmentation terminals in an extending direction, the segmentation terminals are located between the head ends and tail ends of the side branch vessels, the head ends of the side branch vessels are crossing ends of the side branch vessels with the main branch vessel to which the side branch vessels belong, the tail ends are farthest ends of the side branch vessels, the extending direction is a direction from the head ends to the tail ends, and the segmentation terminals at least cross cross-sections, perpendicular to center lines of the side branch vessels, of bifurcation crest points of the segmented side branch vessels in the extending direction. The training apparatus for angiography image processing of the present invention corresponds to the training method for angiography image processing in all the above embodiments.

In the above training data, as for the local segmentation result data of the side branch vessels, each of the segmented side branch vessels at least contains a segment of normal lumen. Said normal lumen is a lumen without stenosis, expansion, overlapping, cutoff or deformation. A deformed lumen is for example a lumen with the shape obviously changed or with an unclear contour. The segment of normal lumen has a clear contour, with a diameter changing gently. Containing the normal lumen can guarantee accurate measurement of the radiuses or diameters of lumens of the side branch vessels for further application.

In order to make results of the side branch vessels segmented by the neural network meet a preset condition, when the training data are made, lengths of the locally segmented side branch vessels may be uniformly specified. To make radius or diameter calculation convenient, in the made training data, lengths of the normal lumens in the locally segmented side branch vessels in the extending direction may be set according to specific standards, and a specified length may be set in advance. For example, the specified length may be set as 1-10 times a diameter of a lumen of the main branch vessel, specifically 2-6 times, and more specifically 3 times or 5 times. Or, from another aspect, as for a specific size for example, the specified length may be 1-15 mm, further 1-10 mm, and more further 2-8 mm. By making the training data through the above standard, the neural network can obtain the better learning effect.

Further, with respect to making the training data, when the side branch vessels are locally segmented, the lengths of the segmented side branch vessels will be shortened as much as possible while it is guaranteed that the segments of the normal lumens are contained, thereby avoiding adverse impact on the side branch vessels at the distal ends as much as possible. At the time of local segmentation, the main branch vessel to be handled is found first. The original angiography image generally contains one kind of main branch vessel. For example, in an original angiography image obtained for the left circumflex artery, all side branch vessels of the left circumflex artery are locally segmented according to the left circumflex artery in the image. With the positions of the cross-sections, perpendicular to the center lines of the side branch vessels, of the bifurcation crest points of the segmented side branch vessels as beginning ends, the segmentation terminals are determined between the head ends and the tail ends of the side branch vessels in the extending direction. For example, when there is a segment of normal lumen in the extending direction from the positions of the cross-sections, perpendicular to the center lines of the side branch vessels, of the bifurcation crest points of the side branch vessels, the segmentation terminals may be determined under the specified length. If there is an abnormal lumen region with stenosis, expansion, overlapping, cutoff or deformation in the extending direction from the positions of the cross-sections, perpendicular to the center lines of the side branch vessels, of the bifurcation crest points of the side branch vessels, the segmentation terminals are determined after extending backwards by a segment from the abnormal lumen segment. That is, the segmentation range covers the abnormal lumen segment and further contains a segment of normal lumen.

In all the above embodiments, the training data are a sample and a label. The obtaining module 21 is configured to obtain the sample and the label, the sample at least contains the original angiography image data, the label at least contains the local segmentation result data of the side branch vessels on the determined main branch vessel, and the training module is configured to train the neural network according to the obtained sample and label.

Specifically, as one of the embodiments of the present invention, the sample is the original angiography image data, that is, the original angiography image is converted to a binary image for the neural network to learn, and the label is the local segmentation result data of the side branch vessels on the determined main branch vessel, or the label is image data combined by segmentation result data of the main branch vessel and the local segmentation result data of the side branch vessels on the main branch vessel. The above segmentation result data of the determined main branch vessel are segmentation image data of the main branch vessel determined from the original angiography image. The segmentation result data of the main branch vessel and the local segmentation result data of the side branch vessels on the main branch vessel are combined, that is, a main branch vessel image and local segmentation images of the side branch vessels on the main branch vessel are merged and displayed in the same image data. For example, the segmentation image of the main branch vessel and the local segmentation result data of the side branch vessels may be combined in a fusing mode.

As another embodiment of the present invention, the sample is original angiography image data marked with the main branch vessel, the label is local segmentation result data of the side branch vessels on the marked main branch vessel, or the label is image data combined by segmentation result data of the marked main branch vessel and the local segmentation result data of the side branch vessels on the main branch vessel, and the segmentation result data of the marked main branch vessel are segmentation image data of the main branch vessel determined from the original angiography image. In the present embodiment, the original angiography image data marked with the main branch vessel contains both the segmentation result data of the main branch vessel and the original angiography image data, and are a result combined by the segmentation result data of the main branch vessel and the original angiography image data. For example, an image fusing a main branch vessel image segmented in an angiography image and an original angiography image may be masked, and a contour of the main branch vessel in the original angiography image may be marked after fusing. Or the contour of the main branch vessel may also be directly marked in the original angiography image, so as to obtain the angiography image marked with the main branch vessel. In the present embodiment, the sample for training the neural network has marked the main branch vessel, and the neural network only needs to be trained to detect all the side branch vessels on the segmented main branch vessel, and perform local segmentation on these side branch vessels. The sample may be obtained by artificially segmenting the main branch vessel and marking the segmented main branch vessel in the original angiography image, or the main branch vessel may also be segmented by adopting a computer algorithm, and then the segmentation result data of the main branch vessel and the original angiography image are fused to obtain the original angiography image marked with the main branch vessel, so that the original angiography image data (for example, a binary image) marked with the main branch vessel are made. The main branch vessel may be automatically and separately segmented by adopting an existing algorithm.

Figure 5:
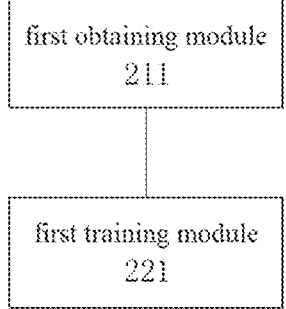
FIG. 5 shows a schematic diagram of a training apparatus for training a first neural network according to another embodiment of the present invention.
Figure 6:
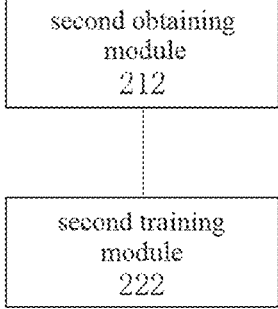
FIG. 6 shows a schematic diagram of a training apparatus for training a second neural network according to another embodiment of the present invention.

As shown in FIG. 5 and FIG. 6, the present invention further provides a specific embodiment of a training apparatus for angiography image processing. A trained neural network includes a first neural network and a second neural network, a sample includes a first sample and a second sample, a label includes a first label and a second label, a training module includes a first training module 221 and a second training module 222, and an obtaining module includes a first obtaining module 211 and a second obtaining module 212. In the training apparatus, the first obtaining module 211 is configured to obtain the first sample and the first label, and the first sample is original angiography image data; the first label is segmentation result data of a determined main branch vessel, or the first label is image data combined by the segmentation result data of the determined main branch vessel and an original angiography image. The first training module 211 is configured to train the first neural network according to the first sample and the first label to make the first neural network perform segmentation on the determined main branch vessel in the original angiography image.

In the training apparatus of the above embodiment, the second obtaining module 212 is configured to obtain the second sample and the second label, and the second sample is original angiography image data marked with the main branch vessel, that is, the second sample contains both the original angiography image and the segmentation result data of the main branch vessel, and are a result combined by the segmentation result data of the main branch vessel and the original angiography image. For example, the second sample may be made in a mode of fusing the segmentation result data of the main branch vessel and the original angiography image data, or in a mode of marking the main branch vessel in the original angiography image. The second sample may implement combination of the original angiography image and the segmentation result data of the main branch vessel in combination with a technology of artificial main branch vessel segmentation and algorithm fusion, or segmentation of the main branch vessel and combination of the main branch vessel and the original angiography image may also be implemented by completely adopting an algorithm. The second label is local segmentation result data of side branch vessels on the marked main branch vessel, or the second label is image data combined by the segmentation result data of the marked main branch vessel and the segmentation result data of the side branch vessels on the main branch vessel. The combination mode may refer to the method mentioned in the above embodiment as well. The above segmentation result data of the marked main branch vessel are segmentation image data of the main branch vessel determined from the original angiography image. The second training module 222 is configured to train the second neural network according to the second sample and the second label to make the second neural network perform local segmentation on the side branch vessels on the marked main branch vessel in the original angiography image. That is, the trained second neural network may perform local segmentation on the side branch vessels on the main branch vessel determined by marking.

Referring to FIG. 7 and FIG. 8, the present invention provides a method for automatically processing a vessel image, including: data containing a to-be-processed original angiography image are obtained; and the data containing the to-be-processed original angiography image are processed based on the neural network obtained through the above training method for angiography image processing, to obtain data containing a local segmentation image of side branch vessels on a determined main branch vessel. When the label in the training method is image data combined by segmentation result data of the main branch vessel and local segmentation result data of the side branch vessels on the main branch vessel, a result output by the trained neural network contains both the segmentation result data of the main branch vessel and the local segmentation result data of the side branch vessels on the main branch vessel. When the neural network subjected to one-step training in the above embodiment is adopted to automatically process the vessel image, after the original angiography image is input, image data of the locally segmented side branch vessels or the image data combined by the segmentation result data of the main branch vessel and the local segmentation result data of the side branch vessels may be directly output. For example, when the trained neural network outputs the image data combined by the segmentation result data of the main branch vessel and the local segmentation result data of the side branch vessels, the method for automatically processing the vessel image specifically includes: S301, the to-be-processed original angiography image data are obtained; and S302, the to-be-processed original angiography image is processed based on the obtained neural network, to obtain the image data combined by the segmentation result data of the main branch vessel and the local segmentation result data of the side branch vessels on the main branch vessel.

In another embodiment, because the trained sample is the original angiography image marked with the main branch vessel, that is, the main branch vessel has been segmented artificially or through an algorithm, the neural network is trained according to the sample, and the image data of the locally segmented side branch vessels or the image data combined by the segmentation result data of the main branch vessel and the local segmentation result data of the side branch vessels may be directly output after inputting the original angiography image data marked with the main branch vessel to the neural network. For example, when the label during training is only the local segmentation result data of the side branch vessels on the marked main branch vessel, the trained neural network outputs the local segmentation result data of the side branch vessels, and then the method for automatically processing the vessel image specifically includes: S401, to-be-processed original angiography image data marked with the main branch vessel are obtained; and S402, the to-be-processed original angiography image data marked with the main branch vessel are processed based on the obtained neural network, to obtain local segmentation image data of the side branch vessels on the marked main branch vessel. The marked main branch vessel is the determined main branch vessel.

Figure 9:
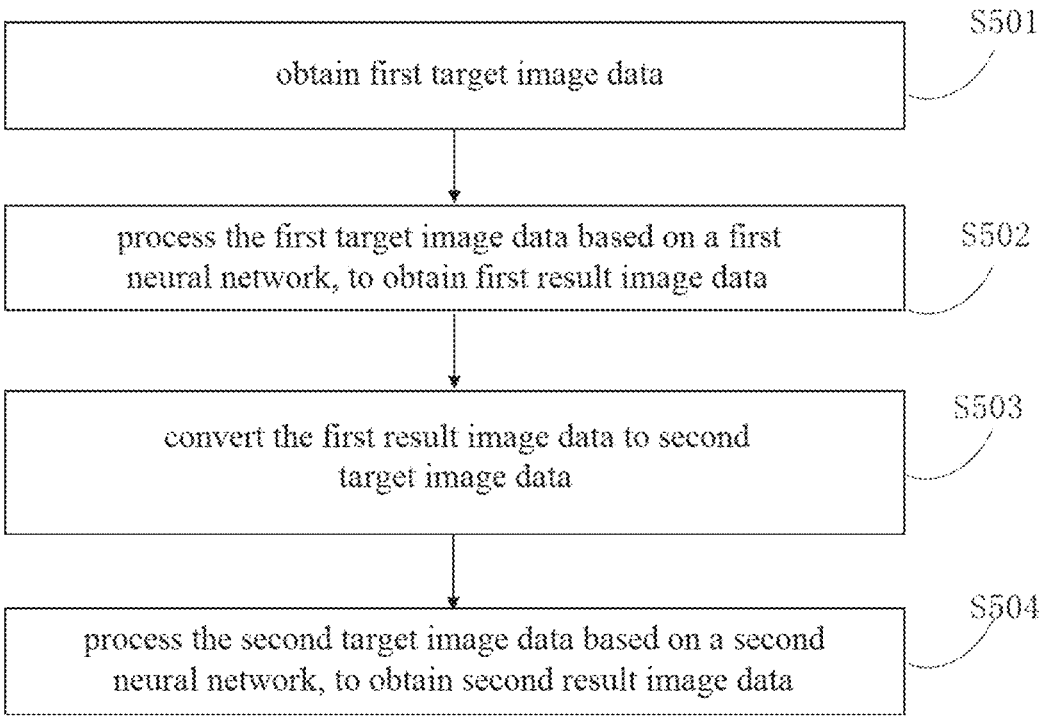
FIG. 9 shows a schematic flow diagram of a method for automatically processing a vessel image according to yet another embodiment of the present invention.

As shown in FIG. 9, the first neural network and the second neural network obtained through step-by-step train-ing in the above embodiment may perform segmentation on the main branch vessel and segmentation on the side branch vessels on the main branch vessel respectively when auto-matically processing the vessel image. The method for automatically processing the vessel image includes: S501, first target image data are obtained, wherein the first target image data are to-be-processed original angiography image data; S502, the first target image data are processed based on the first neural network obtained through step-by-step train-ing, to obtain first result image data, wherein the first result image data contain segmentation image data of the deter-mined main branch vessel; S503, the first result image data are converted to second target image data, wherein the second target image data are original angiography image data marked with the main branch vessel; and S504, the second target image data are processed based on the second neural network obtained through step-by-step training, to obtain second result image data, wherein the second result image data contain local segmentation image data of the side branch vessels on the determined main branch vessel. That is, in the present embodiment, an output result of the first neural network is subjected to processing steps such as converting and then serves as input information of the second neural network.

In the above embodiment, the first result image data contain the segmentation image data of the determined main branch vessel, and the result output by the first neural network corresponds to a first label input when the first neural network is trained. Specifically, when the first label is the segmentation result data of the determined main branch vessel, the first result image data are the segmentation image data of the main branch vessel. Or when the first label is image data combined by the segmentation result data of the determined main branch vessel and an original angiography image, the first neural network outputs both the segmenta-tion image data of the main branch vessel and original angiography image data, that is, the first result image data are the image data combined by a segmentation image of the main branch vessel and the original angiography image, and the image data are a contour of the main branch vessel marked in the vessel image. In a similar way, a result output by the second neural network corresponds to a second label input when the second neural network is trained. That is, the second result image data contain the local segmentation image data of the side branch vessels on the determined main branch vessel. Specifically, the second result image data are the segmentation image data of the side branch vessels on the determined main branch vessel. Or, in addi-tion to the segmentation image data of the side branch vessels, the second result image data further include the segmentation image data of the main branch vessel to which the side branch vessels belong, that is, the second result image data are image data combined by the segmentation image of the determined main branch vessel and a local segmentation image of the side branch vessels on the main branch vessel. The determined main branch vessel is the main branch vessel determined by marking, and the main branch vessel is obtained by segmenting through the first neural network. Through joint processing by the first neural network and the second neural network, the main branch vessel is detected through the first neural network, and the side branch vessels on the main branch vessel are detected through the second neural network, so that local segmenta-tion of the side branch vessels on the main branch vessel needing to be determined in the original angiography image is implemented.

Further, in the present embodiment, the first result image data output by the trained first neural network is only the segmentation image data of the determined main branch vessel. The converting the first result image data to the second target image data includes: the first result image data and the first target image data are fused to obtain the original angiography image data marked with the main branch vessel. That is, in the present embodiment, the image data combined by the segmentation image of the main branch vessel and the original angiography image are obtained by further converting. The first neural network outputs the segmentation image data of the main branch vessel, the result is accurate, and fusing of the segmentation image of the main branch vessel and the original angiography image may be completed by subsequent processing. In another embodiment, if the result output by the first neural network is the image data combined by the segmentation result data of the determined main branch vessel and the original angiography image, the output first result image data may be directly converted to the second target image data to serve as input of the second neural network without fusing.

Further, in the present embodiment, the second result image data output by the trained second neural network is only the local segmentation image data of the side branch vessels on the determined main branch vessel. After the output result of the second neural network is obtained, the second result image data are processed, and the second result image data and the segmentation image data of the determined main branch vessel are fused to obtain fused image data. The fused image data are composed of the segmentation image of the main branch vessel and the local segmentation image of the side branch vessels and may serve as image data for subsequent application. The second neural network outputs the local segmentation image data of the side branch vessels, the result is accurate, and fusing of the segmentation image of the main branch vessel and the local segmentation image of the side branch vessels may be completed by subsequent processing.

In all the above embodiments, the method for automatically processing the vessel image further includes: a converting instruction is received, and the first result image data are converted to the second target image data according to the received converting instruction. After the first neural network outputs the first result image data and after the converting instruction is received, the converting step is performed. A user may view the output result after the first neural network completes output, and if the output result meets the requirement, the converting instruction may be input so as to enter into the subsequent converting step. In addition, the method for automatically processing the vessel image in the present embodiment may set a display step to directly display the output result of the first neural network for the user to view conveniently.

Further, the method for automatically processing the vessel image further includes: data of a segmentation image of a corrected main branch vessel are input, and data containing the segmentation image of the corrected main branch vessel are updated as the first result image data. Specifically, when the segmentation image of the main branch vessel output by the first neural network does not meet the requirement, the user may correct a segmentation result of the main branch vessel, then input the data of the segmentation image of the corrected main branch vessel to serve as the first result image data, and then input the converting instruction to convert the updated first result image data to the second target image data. It is equivalent that the present embodiment adds a correcting opportunity for the segmentation result of the main branch vessel output by the first neural network, and an error rate is decreased. Because the segmentation result of the main branch vessel can be corrected, the corrected result serves as the more accurate basis, so that subsequent local segmentation on the side branch vessels by the second neural network is more accurate as well. In addition, according to the method for automatically processing the vessel image in the present embodiment, data of a local segmentation result of corrected side branch vessels may also be input to correct the output result of the second neural network, and the corrected result is input to serve as the second result image data, thereby further improving accuracy.

Figure 10:
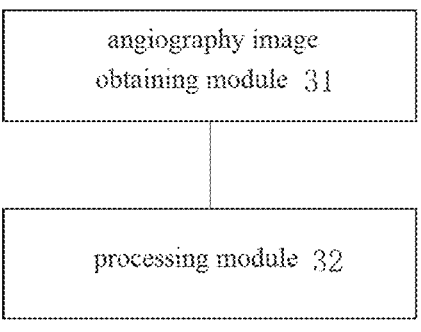
FIG. 10 shows a schematic diagram of an apparatus for automatically processing a vessel image according to an embodiment of the present invention.

As shown in FIG. 10, the present invention further provides an apparatus for automatically processing a vessel image, including: an angiography image obtaining module 31, configured to obtain data containing a to-be-processed original angiography image; and a processing module 32, configured to process the data containing the to-be-processed original angiography image based on the neural network obtained through the above one-step training, to obtain data containing a local segmentation image of side branch vessels on a determined main branch vessel. When the neural networks obtained according to the training method of the above different embodiments perform image processing correspondingly, one of the input data containing the to-be-processed original angiography image is to-be-processed original angiography image data, and the other is image data combined by a segmentation image of the main branch vessel and an original angiography image. One of the output data containing the local segmentation image of the side branch vessels on the determined main branch vessel is local segmentation image data of the side branch vessels on the determined main branch vessel, and the other is image data combined by the segmentation image of the main branch vessel and the local segmentation image of the side branch vessels on the main branch vessel. The apparatus for automatically processing the vessel image in the present embodiment corresponds to the method for automatically processing the vessel image in the above embodiment. The apparatus for automatically processing the vessel image of the present invention corresponds to the method for automatically processing the vessel image in all the above embodiments.

Figure 11:
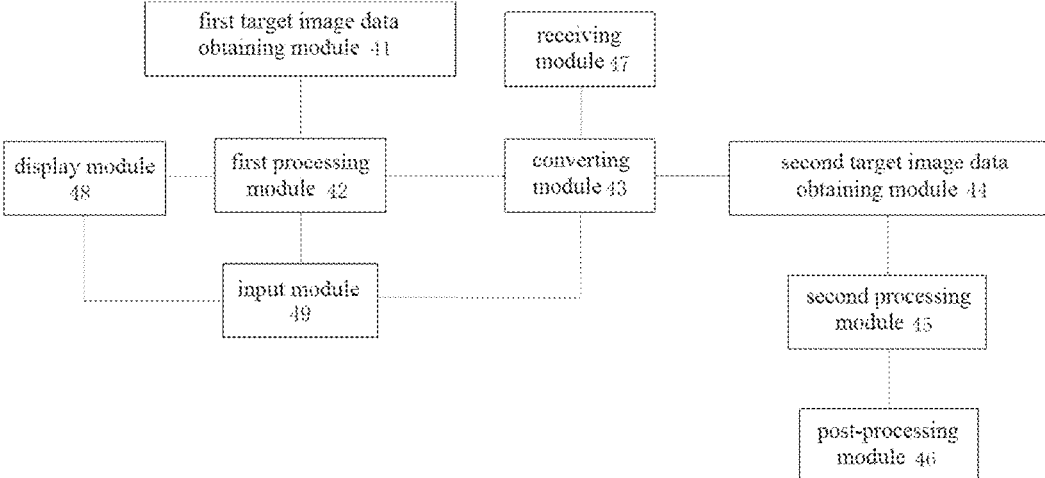
FIG. 11 shows a schematic diagram of an apparatus for automatically processing a vessel image according to another embodiment of the present invention.

As shown in FIG. 11, in another embodiment, an apparatus for automatically processing a vessel image includes: a first target image data obtaining module 41, configured to obtain first target image data, wherein the first target image data are to-be-processed original angiography image data; a first processing module 42, configured to process the first target image data based on the first neural network obtained through the step-by-step training method, to obtain first result image data, wherein the first result image data contain segmentation image data of a determined main branch vessel; a converting module 43, configured to convert the first result image data to second target image data, wherein the second target image data are original angiography image data marked with the main branch vessel; a second target image obtaining module 44, configured to obtain the second target image data; and a second processing module 45, configured to process the second target image data based on the second neural network obtained through the step-by-step training method, to obtain second result image data, wherein the second result image data contain local segmentation image data of side branch vessels on the determined main branch vessel. That is, in the present embodiment, by setting the converting module 42, an output result of the first neural network is subjected to processing steps such as converting and then serves as input information of the second neural network. The apparatus for automatically processing the vessel image in the present embodiment corresponds to the method for automatically processing the vessel image in the above embodiment.

In the above embodiment, the first result image data are the segmentation image data of the determined main branch vessel, and the converting module 42 is configured to fuse the first result image data and the first target image data to obtain the original angiography image data marked with the main branch vessel. The first neural network outputs the segmentation image data of the main branch vessel, the result is accurate, and fusing of a segmentation image of the main branch vessel and an original angiography image may be completed by subsequent processing through the converting module 42.

Further, the second result image data are the local segmentation image data of the side branch vessels on the determined main branch vessel, and the apparatus for automatically processing the vessel image further includes a post-processing module 46 configured to fuse the second result image data and the segmentation image data of the determined main branch vessel to obtain fused image data.

Referring to FIG. 10, in all the above embodiments, the apparatus for automatically processing the vessel image further includes a receiving module 47 configured to receive a converting instruction, wherein the converting module 42 is configured to convert the first result image data to the second target image data according to the received converting instruction. After the first neural network outputs the first result image data and after the receiving module 47 receives the converting instruction, the converting step is performed. A user may view the output result after the first neural network completes output, and if the output result meets the requirement, the converting instruction may be input so as to enter into the subsequent converting step. In addition, the apparatus for automatically processing the vessel image in the present embodiment may set a display module 48 to directly display the output result of the first neural network for the user to view conveniently. Or the user may also output the first result image data to other devices for viewing.

Further, the apparatus for automatically processing the vessel image further includes an input module 49 configured to data of a segmentation image of a corrected main branch vessel, and update data containing the segmentation image of the corrected main branch vessel as the first result image data. Specifically, when the segmentation image of the main branch vessel output by the first neural network does not meet the requirement, the user may correct a segmentation result of the main branch vessel, and then input the data of the segmentation image of the corrected main branch vessel through the input module 49, the input module 49 updates an input result as the first result image data, then the user inputs the converting instruction, and the receiving module 47 receives the converting instruction to convert the updated first result image data to the second target image data.

All the above embodiments provide the training method and training apparatus for angiography image processing, and obtain the method and apparatus for automatically processing the vessel image, so that automatic local segmentation of the side branch vessels is implemented. Compared with full segmentation, the accuracy is obviously improved, the situations of missing segmentation and wrong segmentation in automatic segmentation by a computer are avoided, and local segmentation will obviously increase the speed of automatic segmentation as well. Particularly in an operative process, the computer can quickly show the situation of the main branch vessel and the corresponding side branch vessels after segmentation, and valuable time is bought for a doctor in the operative process.

Correspondingly, the present invention provides a computer device. The computer device includes a processor and a memory, the memory stores at least one instruction, and the at least one instruction, when executed by the processor, implements the training method for angiography image processing in all the above embodiments, or the method for automatically processing the vessel image in all the above embodiments.

The present invention further provides a computer readable storage medium. The computer readable storage medium stores at least one instruction, and the at least one instruction, when executed, implements the training method for angiography image processing in all the above embodiments, or the method for automatically processing the vessel image in all the above embodiments.

A segmented angiography image obtained by adopting an existing method will influence a matching effect due to poor segmentation effect in application research of registering of an angiography image and an endoluminal image. The segmented angiography image obtained by adopting existing method, when applied to FFR calculation, will also influence accuracy of calculation.

In an exemplary embodiment, the present invention further provides a method for registering an endoluminal image and an angiography image, which adopts the method for automatically processing the vessel image in the above embodiment to obtain a local segmentation image of side branch vessels. A segmentation image of a main branch vessel may be obtained through the method for automatically processing the vessel image in all the above embodiments, or other algorithms. Then a composite image combined by the segmentation image of the main branch vessel and the local segmentation image of the side branch vessels on the main branch vessel is obtained, and the composite image is matched with the endoluminal image of the main branch vessel. Specifically, the obtained segmentation images of the main branch vessel and the side branch vessels on the main branch vessel are fused to obtain a fused image, according to positions of the side branch vessels in the fused image and geometric parameters of crossing ends between the side branch vessels and the main branch vessel, at a certain position of the main branch vessel in the fused image, endoluminal image data corresponding to the position are found to complete matching of the fused image with the endoluminal image, thereby implementing registering of the endoluminal image and the angiography image.

By adopting the training method for angiography image processing and the method for automatically processing the vessel image provided by the present invention, the segmentation image of the side branch vessels with the accurate result can be obtained, and thus the accuracy and convenience of registering of the endoluminal image and the angiography image can be improved.

In an exemplary embodiment, the present invention further provides a method for calculating a fractional flow reserve, which adopts the method for automatically processing the vessel image in all the above embodiments to obtain a local segmentation image of side branch vessels. A segmentation image of a main branch vessel may be obtained through the method for automatically processing the vessel image in all the above embodiments, or other algorithms. Diameters or radiuses of the main branch vessel and the side branch vessels are obtained according to the segmentation image of the main branch vessel and the side branch vessels, geometric parameters of an ideal lumen of the main branch vessel are worked out, and thus the fractional flow reserve of the main branch vessel is obtained. Specifically, according to the obtained segmentation image of the main branch vessel and the side branch vessels, the diameters or radiuses of the main branch vessel and the side branch vessels on the main branch vessel may be obtained through an existing method by, for example, measurement through measuring software. Then a radius of the ideal lumen of the main branch vessel or a diameter of the ideal lumen of the main branch vessel is worked out by adopting the following formula 1, and substituted into a calculation formula of FFR to obtain the fractional flow reserve of the main branch vessel of interest.

$$R_i'^3 = R_{i-1}^3 - \frac{r_i^3}{\sum_{i=1}^{k} \omega_i r_i^3}(R_0^3 - R_k^3)$$ (Formula 1)

In the formula, $r_i$ represents a radius or diameter of a vessel lumen at the $i^{th}$ bifurcation from a proximal start point to a distal end point of a vessel segment. $R_i$ represents a radius or diameter of a vessel lumen between the $(i-1)^{th}$ bifurcation and the $i^{th}$ bifurcation from the proximal start point to the distal end point of the vessel segment. $R_0$ represents a radius or diameter of a vessel lumen at the proximal start point of the vessel segment; $R_k$ represents a radius or diameter of a vessel lumen at the distal end point of the vessel segment; and Ri' represents a radius or diameter of an ideal vessel lumen between the $(i-1)^{th}$ bifurcation and the $i^{th}$ bifurcation from the proximal start point to the distal end point of the vessel segment.

In order to further improve the accuracy of the calculation result, each of the segmented side branch vessels at least contains a segment of normal lumen.

By adopting the training method for angiography image processing and the method for automatically processing the vessel image provided by the present invention, the segmentation image of the side branch vessels with the accurate result can be obtained, thus the accuracy of FFR calculation can be improved, and short time is consumed.

Although the present invention has been illustrated and described with reference to certain preferred implementations of the present invention, it should be understood by those of ordinary skill in the art that the above contents are further detailed description made to the present invention in combination with the specific implementations, and it should not be considered that the specific implementation of the present invention is only limited to these descriptions. Those skilled in the art can make various modifications to the present invention in form and detail, including making several simple deductions or substitutions without departing from the spirit and scope of the present invention.

The invention claimed is:

1. A training method for angiography image processing, comprising:

obtaining training data that include a sample and a label, wherein:

the sample contains original angiography image data, the label contains local segmentation result data of a side branch vessel on a determined main branch vessel, local segmentation of the side branch vessel has a segmentation range extending from a head end of the side branch vessel to a segmentation terminal in an extending direction, the segmentation terminal is located between the head end and a tail end of the side branch vessel, the local segmentation resulting in a segment of the side branch vessel from the head end to the segmentation terminal, the head end of the side branch vessel is a crossing end of the side branch vessel with the main branch vessel to which the side branch vessel belongs, the tail end is a farthest end of the side branch vessel, the extending direction is a direction from the head end to the tail end, and the segmentation terminal at least crosses a cross-section, perpendicular to a center line of the side branch vessel, of a bifurcation crest point of the segmented side branch vessel in the extending direction; and training a neural network according to the obtained training data to make the neural network perform local segmentation on the side branch vessel on the determined main branch vessel in an original angiography image.

2. The training method for angiography image processing of claim 1, wherein:

the local segmentation result data of the side branch vessel, the segmented side branch vessel at least contains a segment of normal lumen; or in the local segmentation result data of the side branch vessel, a length of the segmented side branch vessel is 1-10 times a diameter of a lumen of the main branch vessel to which the side branch vessel belongs.

3. The training method for angiography image processing of claim 2, wherein:

the normal lumen is a lumen without narrowing, expansion, overlapping, cutoff or deformation; or a length of the normal lumen in the extending direction is 1-15 mm.

4. The training method for angiography image processing of claim 1, wherein:

the sample is the original angiography image data, the label is:

the local segmentation result data of the side branch vessel on the determined main branch vessel, or image data composed of segmentation result data of the main branch vessel and the local segmentation result data of the side branch vessel on the main branch vessel, and the segmentation result data of the determined main branch vessel are segmentation image data of the main branch vessel determined from the original angiography image.

5. The training method for angiography image processing of claim 1, wherein:

the sample is original angiography image data marked with the main branch vessel, the label is:

local segmentation result data of the side branch vessel on the marked main branch vessel, or image data composed of segmentation result data of the marked main branch vessel and the local segmentation result data of the side branch vessel on the main branch vessel, and the segmentation result data of the marked main branch vessel are segmentation image data of the main branch vessel determined from the original angiography image.

6. The training method for angiography image processing of claim 1, wherein:

the neural network includes a first neural network and a second neural network;

the sample includes a first sample and a second sample; and the label includes a first label and a second label;

the first sample is the original angiography image data;

the first label is:

segmentation result data of the determined main branch vessel, or image data combined by the segmentation result data of the determined main branch vessel and the original angiography image data;

the first neural network is trained according to the first sample and the first label to make the first neural network perform segmentation on the determined main branch vessel in the original angiography image;

the second sample is original angiography image data marked with the main branch vessel;

the second label is:

local segmentation result data of the side branch vessel on the marked main branch vessel, or image data combined by segmentation result data of the marked main branch vessel and the local segmentation result data of the side branch vessel on the main branch vessel;

the segmentation result data of the marked main branch vessel are segmentation image data of the main branch vessel determined from the original angiography image; and the second neural network is trained according to the second sample and the second label to make the second neural network perform local segmentation on the side branch vessel subordinate to the marked main branch vessel in the original angiography image.

7. A method for automatically processing a vessel image, the method comprising:

obtaining first target image data, wherein the first target image data are to-be-processed original angiography image data;

processing the first target image data based on the first neural network obtained through the training method for angiography image processing of claim 6, to obtain first result image data, wherein the first result image data contain segmentation image data of a determined main branch vessel;

converting the first result image data to second target image data, wherein the second target image data are original angiography image data marked with the main branch vessel; and processing the second target image data based on the second neural network obtained through the training method for angiography image processing, to obtain second result image data, wherein the second result image data contain local segmentation image data of a side branch vessel on the determined main branch vessel.

8. The method for automatically processing the vessel image of claim 7, wherein:

the first result image data are the segmentation image data of the determined main branch vessel, and converting the first result image data to the second target image data includes comprises fusing the first result image data and the first target image data to obtain the original angiography image data marked with the main branch vessel.

9. The method for automatically processing the vessel image of claim 7, wherein:

the second result image data are the local segmentation image data of the side branch vessel on the determined main branch vessel, and the method for automatically processing the vessel image further comprises fusing the second result image data and the segmentation image data of the determined main branch vessel to obtain fused image data.

10. The method for automatically processing the vessel image of claim 7, further comprising:

receiving a converting instruction, and converting the first result image data to the second target image data according to the received converting instruction.

11. The method for automatically processing the vessel image of claim 10, further comprising:

inputting data of a segmentation image of a corrected main branch vessel, and updating data containing the segmentation image of the corrected main branch vessel as the first result image data.

12. A method for automatically processing a vessel image, the method comprising:

obtaining data containing a to-be-processed original angiography image; and processing the data containing the to-be-processed original angiography image based on the neural network obtained through the training method for angiography image processing of claim 1, to obtain data containing a local segmentation image of a side branch vessel on a determined main branch vessel.

13. A method for registering an endoluminal image and an angiography image, the method comprising:

obtaining a local segmentation image of a side branch vessel by adopting the method for automatically processing the vessel image of claim 12;

obtaining a segmentation image of a main branch vessel to which the side branch vessel belongs; and matching the segmentation image of the main branch vessel and the segmentation image of the subordinate side branch vessel with the endoluminal image of the main branch vessel.

14. A method for calculating a fractional flow reserve, the method comprising:

obtaining a local segmentation image of a side branch vessel by adopting the method for automatically processing the vessel image of claim 12;

obtaining a segmentation image of a main branch vessel to which the side branch vessel belongs;

obtaining diameters or radiuses of the main branch vessel and the side branch vessel according to the segmentation image of the main branch vessel and the subordinate side branch vessel;

working out geometric parameters of an ideal lumen of the main branch vessel; and obtaining the fractional flow reserve of the main branch vessel by calculation.

15. A computer device comprising a processor and a memory, wherein:

the memory stores at least one instruction, and the at least one instruction, when executed by the processor, implements the method for automatically processing the vessel image of claim 12.

16. A computer device comprising a processor and a memory, wherein:

the memory stores at least one instruction, and the at least one instruction, when executed by the processor, implements the training method for angiography image processing of claim 1.

* * * * *